United States Patent Office 2,917,516
Patented Dec. 15, 1959

2,917,516

METHOD OF MAKING THIAZOLE OR OXAZOLE QUATERNARY SALTS

Leslie G. S. Brooker and Grafton H. Keyes, Rochester, N.Y., assignors to Eastman Kodak Company, Rochester, N.Y., a corporation of New Jersey No Drawing. Application November 25, 1957
Serial No. 698,324

5 Claims. (Cl. 260—304)

This invention relates to a method of making thiazole or oxazole quaternary salts which are useful in the preparation of cyanine dyes for sensitizing photographic silver halide emulsions.

Spectral sensitizing dyes for photographic silver halide emulsions of numerous types have been previously described in the prior art. Among the most important of these sensitizing dyes are those referred to as carbocyanine dyes and merocarbocyanine dyes. It is known that these two classes of dyes can be modified in several ways, one of which is by varying the alkyl group attached to the nitrogen atom of at least one of the heterocyclic basic nuclei. For example, Sprague U.S. Patent 2,503,-776, issued April 11, 1950, describes carbocyanine dyes having improved properties which contain a N-sulfoalkyl group.

In the preparation of either carbocyanine or merocarbocyanine dyes, it is the customary practice to use as one of the reactants a cyclammonium quaternary salt containing a reactive methyl group. The preparation of a number of cyclammonium quaternary salts containing a reactive methyl group and having a sulfoalkyl group attached to the nitrogen atom of the heterocyclic ring is described in the Sprague patent referred to above. Among the heterocyclic nuclei mentioned in the Sprague patent is benzoxazole. However, we have found that the yield of quaternary salt obtained by heating together a benzoxazole base and an alkali metal salt of a halogenated alkanesulfonic acid are quite small, so that it is especially difficult to prepare benzoxazole dyes using the quaternization technique described in the Sprague patent. We have found an improved method of making both thiazole and oxazole quaternary salts of the general type described in the Sprague patent.

It is, therefore, an object of our invention to provide an improved method of making thiazole quaternary salts containing a reactive methyl group. It is also an object of our invention to provide an improved process for preparing oxazole quaternary salts containing a reactive methyl group. Other objects will become apparent from a consideration of the following description and examples.

We have found that cyclammonium quaternary salts containing a reactive methyl group of the type described can be prepared by reacting together a primary amine selected from those represented by the following general formula:

(I)

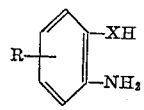

wherein R represents a hydrogen atom, a lower alkyl group (e.g., methyl, ethyl, propyl, butyl, etc.), a mononuclear aromatic group of the benzene series (e.g., phenyl, chlorophenyl, tolyl, etc., especially such groups containing from 6 to 7 carbon atoms), a lower alkoxyl group (e.g., methoxyl, ethoxyl, etc.), an amino group (e.g., amino, methylamino, dimethylamino, ethylamino, diethylamino, etc.) or a halogen atom (e.g. chlorine, bromine, etc.), and X represents an oxygen atom or a sulfur atom, with a compound selected from those represented by the following general formula:

(II)

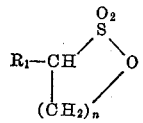

wherein $n$ is a positive integer of from 2 to 3 and $R_1$ represents a hydrogen atom or a lower alkyl group (e.g., methyl, ethyl, etc.), or alternatively, by reacting a compound of Formula I above with a compound selected from those represented by those of the following general formula:

(III)

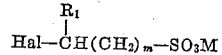

wherein Hal represents a halogen atom, such as chlorine, bromine, etc., $m$ represents a positive integer of from 1 to 3, M represents an alkali metal atom, such as sodium, potassium, etc., and $R_1$ has the same meaning given above. Either of the reactions referred to above, i.e., the reaction of the compounds of Formula I with either those of Formula II or Formula III, leads to the formation of alkylated compounds, which can be converted into the desired intermediate containing a reactive methyl group by simple treatment with acetic anhydride or acetyl chloride, as described in more detail below.

The reaction of the compounds of Formula I with those of Formula II leads to the formation of products represented by the following general formula:

(IV)

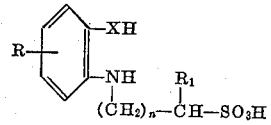

wherein R, $R_1$, X and $n$ each have the values given above.

The reaction of the compounds of Formula I with those of Formula III leads to the formation of products represented by the following general formula:

(IVa)

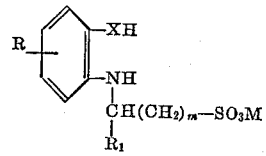

wherein R, $R_1$, X, M and $m$ each have the values given above.

The reaction of the compounds of Formula I with those of Formula II can be accelerated by first heating the reaction mixture until the reaction begins. Once the reaction starts, it is exothermic and proceeds without heating. Reaction of the compounds of Formula I with those of Formula III can also be accelerated by heating. Generally, a temperature of about 100° C. is sufficient to instigate reaction of the compounds of Formula I with either those of Formula II or Formula III. The most useful temperatures will vary somewhat depending upon the particular reactants, the presence or absence of a solvent, etc. It is frequently desirable to carry out the reaction of the compounds of Formula I with those of Formula II or Formula III in an inert atmosphere, such as nitrogen.

While inert diluents can be employed, there is generally no advantage in using them, inasmuch as their use means that an additional step is needed in the purification.

The products represented by Formula IV and Formula IVa above can be reacted with acetyl chloride or acetic anhydride to produce the desired heterocyclic quaternary salts containing a reactive methyl group. The reaction with acetic anhydride or acetyl chloride can be accelerated by heating, temperatures varying from about 60° C. to the reflux temperature of the reaction mixture being adequate. In general, the yields of the desired quaternary salts can be improved by using an amount of acetic anhydride or acetyl chloride in excess to the amount required by theory.

The products resulting from the condensation of acetic anhydride or acetyl chloride with the compounds of Formula IV can be represented by the following general formula:

(V)

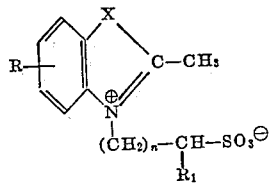

wherein R, $R_1$, X and $n$ each have the same meanings given above.

The products resulting from the condensation of acetic anhydride or acetyl chloride with the compounds of Formula IVa can be represented by the following general formula:

(Va)

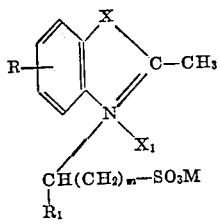

wherein R, $R_1$, X, M and $m$ each have the values given above, and $X_1$ represents an acid anion, such as chloride, bromide, etc. (depending upon the particular halogen atom present in the compounds of Formula III). In general, it is not necessary to separate either the compounds of Formula V or Formula Va from the reaction medium, since they can be directly converted to the desired sensitizing dyes. The compounds of Formula V can be treated with an alkali metal halide, such as sodium iodide and thus be converted into the compounds of Formula Va, which can be used for the desired condensations. Treatment of the compounds of Formula V with an alkali metal halide produces intermediates which are more easily adapted for dye condensations, since the products of Formula V are sometimes viscous liquids difficult to handle. Before using either the compounds of Formula V or Formula Va in dye condensations, it is convenient to extract unreacted materials from the reaction mixtures containing these compounds by treatment with diethyl ether or some convenient organic diluent in which the compounds of Formula V or Formula Va are not soluble. The diluent then extracts unreacted materials and can be readily separated from the reaction mixture.

The compounds of Formula V or Formula Va can be used directly in the preparation of either carbocyanine or merocarbocyanine dyes containing a sulfoalkyl group. For example, these intermediates can be reacted according to the method described in Dent et al. U.S. Patent 2,537,880, issued January 9, 1951. The method of the Dent et al. patent uses a dialkoxymethyl carboxylate in combination with a cyclammonium quaternary salt of the type represented by Formula V or Formula Va. Another method of preparing carbocyanine dyes using cyclammonium quaternary salts containing a reactive methyl group is described in I.C.I. British Patent 344,409, accepted March 4, 1931.

The following examples will serve to illustrate more fully the manner of preparing the compounds of Formula V or Formula Va, as well as the conversion of these intermediates into dyes useful in extending the sensitivity of ordinary silver halide emulsions.

Example 1.—2-methyl-3-(4-sulfobutyl)benzothiazolium iodide, sodium salt

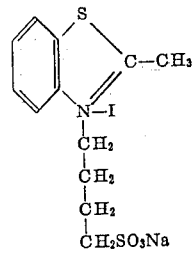

A mixture of 12.5 g. (1 mol.) of o-aminothiophenol and 13.6 g. (1 mol.) of 1,4-butane sultone was placed in a flask previously filled with nitrogen gas. This was placed in an oil bath at about 100° C. and the temperature was gradually raised to about 140° C. At this point the temperature of the reaction mixture quickly rose to above that of the oil bath to about 180° C. and a very viscous reaction product was soon formed. Nitrogen gas was passed into the reaction flask all during this period of heating which was a total of about 20 minutes. The reaction mixture was then removed from the oil bath, 30 cc. of acetic anhydride was added and the mixture refluxed for 1 hour. After chilling, it was treated with 100 cc. of ether. After decantation of the ethereal liquids, the viscous residue was dissolved in 25 cc. of methyl alcohol. To this solution was added a solution of 15 g. (1 mol.) of sodium iodide dissolved in 200 cc. of methyl alcohol. The quaternary salt separated on chilling and was collected on a filter, washed with acetone and dried. A yield of 16.6 g. 37% of theory was obtained.

Example 2.—2-methyl-3-β-sulfoethylbenzoxazolium bromide, sodium salt

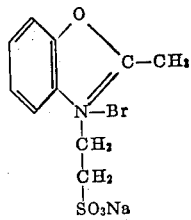

o-Aminophenol (21.8 g., 1 mol.) and sodium β-bromoethanesulfonic acid (42.2 g., 1 mol.) were thoroughly mixed and heated in an oil bath at 180–190° C. After cooling, acetic anhydride (100 ml.) was added and the mixture heated for two hours. Acetic acid was then slowly distilled off, the residue cooled and poured with stirring into ether (1000 ml.). The crude product (51 g., 74%) was collected on a filter, washed with ether and dried in a vacuum desiccator. The crude hygroscopic quaternary salt was used in dye preparation without further purification.

Example 3.—Anhydro-3,3'-di-β-sulfoethyloxacarbocyanine hydroxide

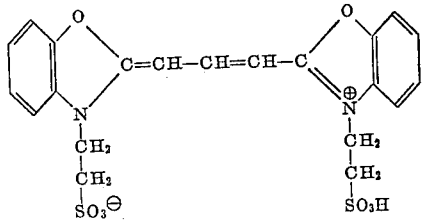

2-methyl-3-β-sulfoethylbenzoxazolium bromide, sodium salt (3.44 g., 1 mol.) and diethoxymethyl acetate (3.24 g., 4 mols.) were dissolved in pyridine (20 ml.) and heated under reflux for fifteen minutes. The crude dye was precipitated with ether, the ether decanted and the residue dissolved in water. The aqueous solution was treated with sodium iodide (10 g.) and stirred with ether until crystallization started. After chilling overnight, the crude dye was collected on a filter and dried. The crude dye was purified by dissolving in methanol and salting out with sodium iodide. The yield after two such treatments was 0.37 g. (15%) M.P. >310° C.

*Example 4.—Anhydro-3'-ethyl-3-β-sulfoethyloxathia-carbocyanine hydroxide*

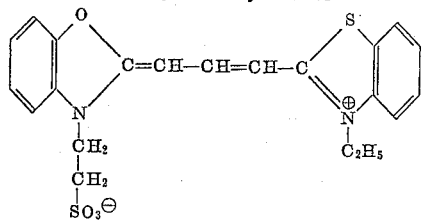

2-methyl-3-β-sulfoethylbenzoxazolium bromide, sodium salt (3.44 g., 2 mols.) and 2-β-acetanilidovinyl-3-ethyl-benzothiazolium iodide (2.25 g., 1 mol.) were dissolved in ethyl alcohol and triethylamine (1.4 ml., 2 mols.) was added. The mixture was then heated under reflux for thirty minutes and the crude product filtered from the hot reaction mixture. After two recrystallizations from methanol, the yield of purified dye was 0.36 g. (17%) M.P. 295–6° C. dec.

*Example 5.—3-methyl-4-[(3-β-sulfoethyl-2(3H)-benzoxazolylidene)-ethylidene]-1-p-sulfophenyl-2-pyrazolin-5-one*

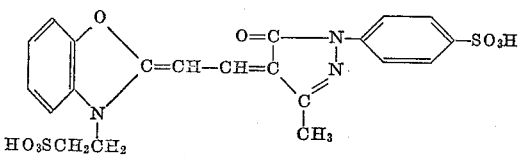

2-β-acetanilidovinyl-3-β-sulfoethylbenzoxazolium bromide, sodium salt (4.9 g., 1 mol.) and 3-methyl-1-p-sulfophenyl-2-pyrazolin-5-one (2.54 g., 1 mol.) in ethyl alcohol (10 ml.) and triethylamine (1.01 g., 1 mol.) were heated at the refluxing temperature for 15 minutes. After cooling, the reaction mixture was acidified with concentrated hydrochloric acid and then it was stirred with ethyl ether (10 ml.) until crystallization occurred. After chilling overnight, the dye was collected on a filter and washed with a little alcohol. The dye was dissolved in water as the triethylamine salt and precipitated by the addition of hydrochloric acid. The yield of deep yellow crystals was 14% after two such treatments and the melting point was above 310° C.

The 2-β-acetanilidovinyl-3-β-sulfoethylbenzoxazolium bromide, sodium salt was prepared by heating 2-methyl-3-β-sulfoethylbenzoxazolium bromide, sodium salt (17.2 g.) and diphenylformamidine (9.8 g.) in acetic anhydride (50 ml.) at the refluxing temperature for 30 minutes. The cool reaction mixture was poured, with stirring, into ethyl ether (500 ml.). After chilling, the product was collected on a filter, transferred to a beaker, suspended in acetone, then collected on a filter, and finally washed with a little acetone and dried in a vacuum desiccator. The yield of light brown crystals was 16.3 g. (67%).

*Example 6.—3-methyl-4-{[3-(4-sulfobutyl)-2(3H)-benzoxazolylidene]-ethylidene}-1-p-sulfophenyl-2-pyrazolin-5-one*

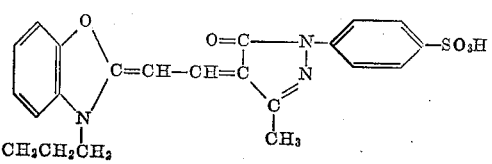

Anhydro - 2 - β - acetanilidovinyl - 3 - (4 - sulfobutyl)benzoxazolium hydroxide (4.14 g., 1 mol.) and 3-methyl-1-p-sulfophenyl-2-pyrazolin-5-one in anhydrous ethyl alcohol (15 ml.) and triethylamine (1.01 g., 1 mol.) were heated at the refluxing temperature for 30 minutes. The cooled reaction mixture was acidified with concentrated hydrochloric acid and stirred with ethyl ether (100 ml.) until crystallization occurred. After chilling overnight, the crude dye was collected on a filter and washed with a little ether. The yield of dye was 66% crude and 40% after two recrystallizations from water. The yellow crystals melted at 293–294° C. with decomposition.

The anhydro - 2 - β - acetanilidovinyl - 3 - (4 - sulfobutyl)benzoxazolium hydroxide was prepared as follows: 2-methylbenzoxazole (13.3 g.) and 1,4-butane sultone (13.6 g.) were heated together at 140° C. for 2 hours. The mixture separated into two layers and the upper layer was decanted and discarded. The remaining residue and diphenylformamidine (19.8 g.) in acetic anhydride (50 ml.) was heated at the refluxing temperature for 30 minutes. The cool reaction mixture was stirred with ether. The ether-acetic anhydride layer was decanted and the sticky residue was washed with ether. The crude product (23.5 g.) was a heavy oil and it was used for dye condensations without further purification.

*Example 7.—Anhydro-3-ethyl-9-methyl-3'-(4-sulfobutyl)thiacarbocyanine hydroxide*

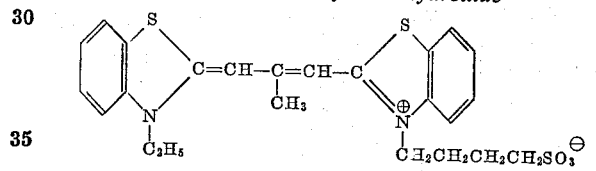

2-methyl-3-(4-sulfobutyl)benzothiazolium iodide, sodium salt (1.4 g. 1 mol.) and 3-ethyl-2-(2-methylmercaptopropenyl)benzothiazolium p-toluenesulfonate in anhydrous ethyl alcohol (25 ml.) and triethylamine (2.0 g.) were heated at the refluxing temperature for 20 minutes. After chilling the reaction mixture, the dye was collected on a filter and washed with methyl alcohol. The yield of dye was 12% crude and 6% after one recrystallization from methyl alcohol. The purplish crystals melted at 267–269° C. with decomposition.

The term "lower alkyl" as used in the foregoing specification and in the following claims means an alkyl group containing from 1 to 4 carbon atoms. The term "lower alkoxyl" as used in the foregoing specification and in the following claims means an alkoxyl group containing from 1 to 2 carbon atoms.

What we claim as our invention and desire secured by Letters Patent of the United States is:

1. An improved method for making sensitizing dye intermediates comprising (1) heating together a compound selected from those represented by the following general formula:

wherein X represents a member selected from the group consisting of an oxygen atom and a sulfur atom and R represents a member selected from the group consisting of a hydrogen atom, a lower alkyl group, a mononuclear aromatic group of the benzene series, a lower alkoxyl group, an amino group and a halogen atom, with a sulfo compound selected from those represented by the following general formulas:

(a)

and (b)    

wherein $R_1$ represents a member selected from the group consisting of a hydrogen atom and a lower alkyl group, Hal represents a halogen atom, M represents an alkali metal atom, $m$ represents a positive integer of from 1 to 3, and $n$ represents a positive integer of from 2 to 3, (2) heating the resulting product with a compound selected from the class consisting of (c) acetic anhydride and (d) acetyl chloride, and (3) separating the desired sensitizing dye intermediate from the reaction mixture.

2. An improved method for making sensitizing dye intermediates comprising (1) heating together o-aminophenol with a sulfo compound selected from those represented by the following general formula:

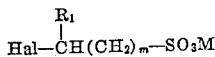

wherein $R_1$ represents a member selected from the group consisting of a hydrogen atom and a lower alkyl group, Hal represents a halogen atom, M represents an alkali metal atom, and $m$ represents a positive integer of from 1 to 3, (2) heating the resulting product with a compound selected from the class consisting of (a) acetic anhydride and (b) acetyl chloride, and (3) separating the desired sensitizing dye intermediate from the reaction mixture.

3. An improved method for making sensitizing dye intermediates comprising (1) heating together o-aminothiophenol with a sulfo compound selected from the class represented by the following general formula:

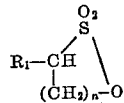

wherein $R_1$ represents a member selected from the class consisting of a hydrogen atom and a lower alkyl group and $n$ represents a positive integer of from 2 to 3, (2) discontinuing heating after the reaction has begun, (3) heating the resulting product with a compound selected from the class consisting of (a) acetic anhydride and (b) acetyl chloride and (4) separating the desired sensitizing dye intermediate from the reaction mixture.

4. An improved method for making a sensitizing dye intermediate comprising (1) heating together o-aminothiophenol with 1,4-butane sultone until reaction has begun, (2) discontinuing heating after said reaction has begun, (3) heating the resulting product together with acetic anhydride and (4) separating the resulting sensitizing dye intermediate from the reaction mixture.

5. An improved method for making sensitizing dye intermediates comprising (1) heating together o-aminophenol with an alkali metal salt of a halogenated alkane sulfonic acid, (2) heating the resulting product together with acetic anhydride, and (3) separating the desired sensitizing dye intermediate from the reaction mixture.

References Cited in the file of this patent

UNITED STATES PATENTS 2,429,179    Anish _____ Oct. 14, 1947

OTHER REFERENCES

Diepolder: Chem. Abstracts, vol. 17, p. 3877 (1923).
Helberger et al.: Liebig's Ann., vol. 565, pp. 22–35 (1949).
Nippon Oil Co. (Japan), No. 155, 163, February 25, 1943. (Abstract relied on: Chem. Abst., vol. 44, col. 2026, 1950.)